Dec. 20, 1960  A. S. HENDERSON ET AL  2,965,316
PLANT OPERATING CONTROL MEANS

Filed Jan. 29, 1959  5 Sheets-Sheet 1

INVENTORS.
ASHLAND S. HENDERSON
EDWARD W. DAVIS
BY
Hyde, Meyer, Baldwin & Doran
ATTORNEYS

Fig. 5

INVENTORS.
ASHLAND S. HENDERSON
EDWARD W. DAVIS
BY

ATTORNEYS

2,965,316

Patented Dec. 20, 1960

2,965,316

PLANT OPERATING CONTROL MEANS

Ashland S. Henderson and Edward W. Davis, Silver Bay, Minn., assignors to Reserve Mining Company, Silver Bay, Minn., a corporation of Minnesota Filed Jan. 29, 1959, Ser. No. 789,837

10 Claims. (Cl. 241—34)

This invention relates to means for controlling the interrelationship between operating units in a multi-unit operating mill. More particularly the invention relates to means for controlling the interrelationship of grinding and classifying units in an ore grinding and beneficiating assembly. For convenience, and as an illustration of one adaptation of the invention, it will be described in connection with the grinding of taconite ore in a system including a rod mill, a ball mill, and one or more magnetic separators and a cyclone classifier or other suitable separator operating in closed circuit with the ball mill.

As will appear somewhat more in detail hereinafter, and still referring to one specific example of the fine grinding and beneficiation of taconite ore, the ore, in fragments of minus three-quarter inch or finer, is fed to a rod mill rotating at approximately 15 r.p.m. from which it is discharged in a water sludge of particles of minus 10 mesh size. The sludge goes to one or more first-step magnetic separators, only one of which need be considered here. In this separator approximately thirty-five percent of the sludge is removed as waste or tailings, the balance, containing above forty percent of magnetic iron, is fed into a ball mill which grinds the taconite particles to approximately thirty percent minus 325 mesh, this ground product being then fed to a second-step magnetic separator where it is divided into a waste tailings and a pulp fraction containing approximately forty-nine percent magnetic iron. This pulp fraction is discharged into a sump whence it is pumped to a cyclone classifier from which a coarser fraction is returned in closed circuit to the ball mill and a finer fraction containing about eighty percent minus 325 mesh and about fifty three percent magnetic iron is routed to further hydroseparators and magnetic separators which upgrade the beneficiated concentrate to above sixty percent iron.

We are here concerned only with the steps involving the rod mill, and the closed circuit including the ball mill, the "first and second" magnetic separators, the sump, and the cyclone classifier.

The pulp is transferred from the sump to the cyclone classifier by means of a pump and appropriate piping. The outlet pressure of the pump is controlled by the cyclone overflow and underflow orifices, and the inlet pressure of the pump is determined by the pulp level in the sump. When these factors and the pulp density are maintained at a constant value the pump operates as a constant volume pump. The density of the pulp is determined by the proportion of liquid to solids therein. The quantity of magnetic solids in the sump is fairly constant because of the two prior stages of magnetic separation. In the cyclone separator the fineness of separation, with a constant pump output, is proportional to the pulp density which in turn can be controlled, as above noted, by increasing or decreasing the water content but if the pulp density decreases to an undesired amount so that the water supply to the sump is decreased, the head or level in the sump may be lowered so as to injuriously affect the pump performance. Therefore the iron content of the feed to the rod mill must be controlled or the pulp density will vary in the system herein described. It is necessary to maintain the pulp density constant in order to obtain reproducible classification in the cyclone classifiers.

Our invention therefore comprises the concept of controlling the quantity of ore fed to the rod mill responsive to a signal proportional to the quantity of magnetic iron in the pulp stream to the classifier, while maintaining a constant level of pulp in the sump so as to maintain a constant pump output to the classifier. This assures a constant pulp density, a constant pump output, and a uniform pulp classification, while the rod mill feed is varied with variations in the grade of ore so that if the magnetic content of the ore feed to the rod mill decreases the quantity of said ore will be correspondingly increased and so that the quantity of magnetic iron passing through the rod mill will accordingly be uniform. Maximum and minimum total weight controls for the rod mill feed conveyor are likewise provided which, if exceeded in either direction, will prevent further control action in the system.

An important object of the invention is to maintain the density and quantity of the pulp, being fed to the classifier, at the desired level so as to obtain reproducible classification at maximum tonnage for economy and quality production.

Another object is to provide an ore-milling circuit which will grind at top efficiency irrespective of the grade of crude ore.

A further object of the present invention is to essentially stabilize the circulating load on the ball mill.

A further object of the invention is to vary the quantity of crude ore fed to the rod mill depending on the magnetic iron content of the pulp output to the cyclone classifier.

Another object of the invention is to correct the ore grinding circuit to compensate for changes in ore grindability.

Other objects and advantages will be apparent from a study of the following description of one embodiment of the invention, in conjunction with the accompanying drawings in which

Fig. 3 is a diagrammatic representation of the electric circuitry and operating elements comprising one embodiment of our invention.

Figures 1, 2, 7:
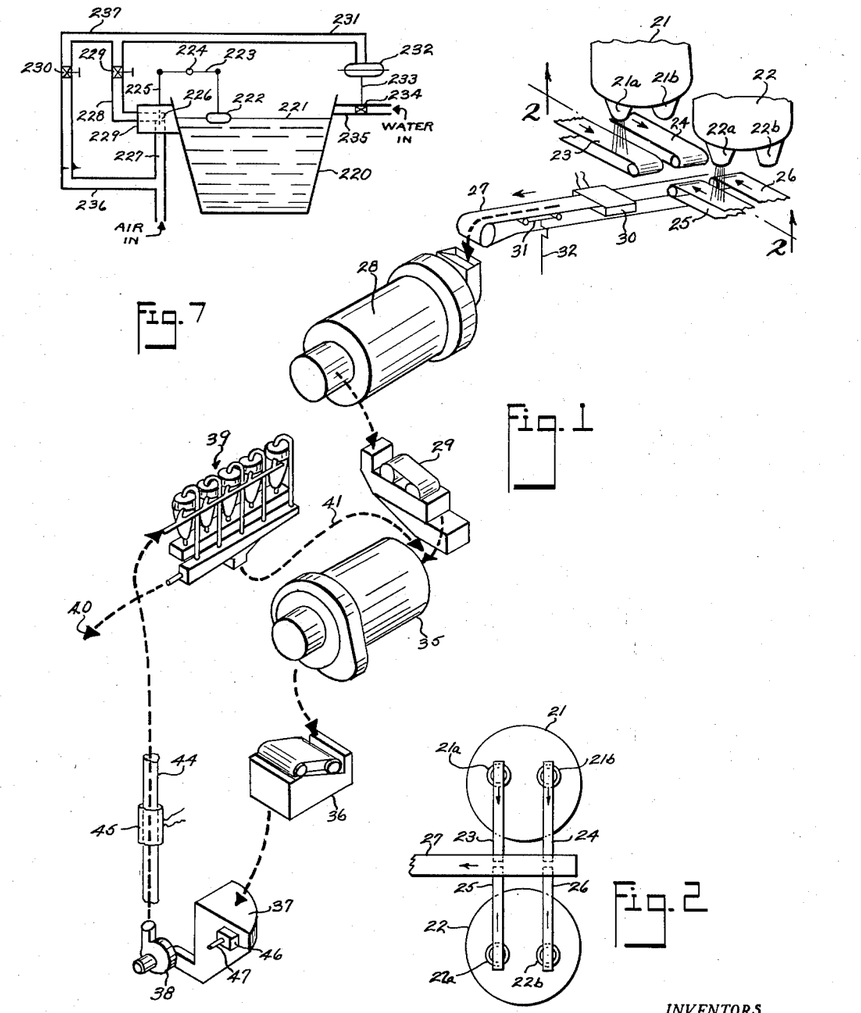
Fig. 1 illustrates in simple pictorial form an exemplification of apparatus units comprising a milling assembly in which our invention is utilized.
Fig. 2 is a plan view taken from approximately the position and in the direction indicated by the arrows 2—2 in Fig. 1.
Fig. 7 illustrates the essential elements of a sump water level control.
Figure 2:
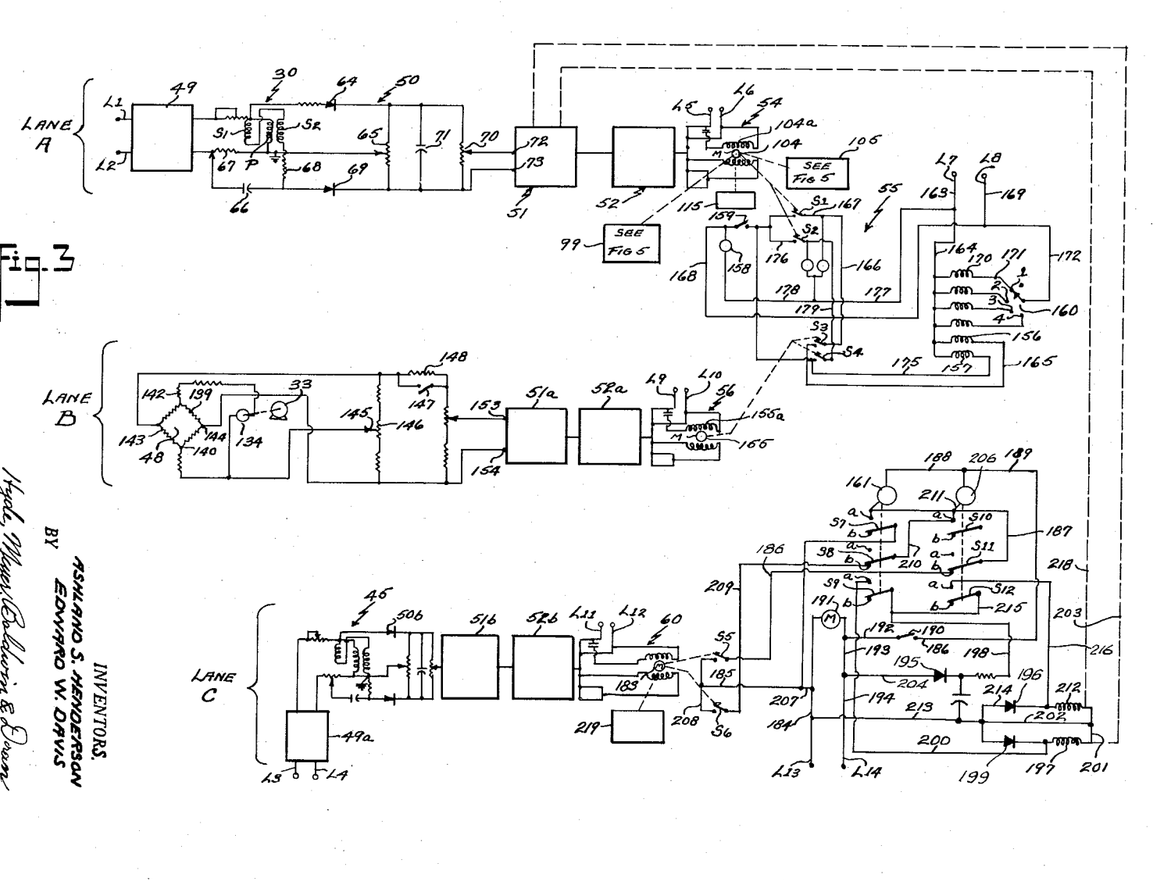

Referring now to Figs. 1 and 2 for a general characterization of the main apparatus elements in our mill control system, we show a pair of feed hoppers 21 and 22 having discharge chute portions 21a, 21b, 22a and 22b each or all of which may be opened to feed fragmented ore to respective auxiliary feed-belts 23, 24, 25 and 26. In one actual operating embodiment two auxiliary belts, for example belts 24 and 26 are normally maintained in standby idle position, belt 23 is set to feed a portion of the total work load, and belt 25 is automatically controlled to feed an additional portion of the load in a manner to be described hereinbelow. The operating auxiliary belts feed the ore fragments to the rod mill conveyor belt 27 which in turn discharges the ore into the receiving chute of a rod mill 28 the function and operation of which are well known to those skilled in the art. It can be briefly mentioned here that the ore fragments are ground, in the presence of water, into a sludge which is discharged from the rod mill to a first magnetic separator 29 which may be conventional in structure and operation.

As will subsequently more fully appear the rod mill conveyor 27 passes through a hollow, box-like electric coil assembly 30 which is capable of sensing the quantitative fractional amount of magnetic material in the total conveyor load. The belt also passes over and in pressure contact with the cradle 31 of a device which has a plunger 32 operatively associated with a load cell capable of sensing and registering the total weight of material, both magnetic and non-magnetic, passing on the belt above cradle 31.

The first magnetic separator 29 transmits a separatable amount of the ore's magnetic fraction to a ball mill 35, and discharges a mainly non-magnetic fraction to a waste outlet, not shown. The ball mill further refines the magnetic fraction and passes it to a second magnetic separator 36 in which the comminuted ore in a sludge mixture is up-graded, and again a non-magnetic fraction is discharged to a waste outlet while a mainly magnetic residue is transmitted to a sump receptacle 37. As previously mentioned it is desirable that the pulp received from the second magnetic separator be controlled at a constant density, and the sump and associated elements contribute towards this end.

The outlet from the sump is equipped with a pump 38 which advances the concentrate or pulp slurry to a battery of "cyclone" separators 39 known in the art. Briefly, their function is to effect a separation of the concentrate slurry into a finer and a coarser portion, the finer portion going (arrow 40) to finishing separators and filters not here shown and the coarser portion being returned (broken route 41) to the input to ball mill 35. It is therefore apparent that the ball mill 35, the second magnetic separator 36, the sump 37, the pump 38, and the cyclone separators 39, are operating in a closed circuit.

The route of the pulp from pump 38 to separators 39 is through a pipe 44. Surrounding this pipe is a sensing coil 45 similar to coil 30 previously mentioned, its function being to sense the quantity of magnetic material in the pulp passing therethrough, and to transmit a proportionately varying signal to further control elements, as will appear.

The water level in the sump may be controlled by any convenient means so as to maintain the inlet pressure on pump 38 at a constant value. The control means is indicated in Fig. 1 by a box 46, and somewhat more in detail in Fig. 7, the water being supplied through pipe 47 when the level control demands it. The outlet pressure on the pump is controlled by the cyclone separator's underflow and overflow orifices, so that by predetermining the pump inlet and outlet pressures the pump operates at constant volume output, and the cyclone separators work at a predictable maximum efficiency. Any variations in pulp density sensed by coil 45 produce a proportionately varying signal which affects certain density control elements so as to offset said variations. Likewise any variations in the magnetic content of the ore on conveyor belt 27 are sensed by coil 30 and a proportionately varying signal is produced which varies the speed of belt 25 so as to increase or decrease the amount of ore, and consequently magnetic material, supplied by this belt. The load cell arrangement (shown at 48 in Fig. 3) serves as a control for the maximum and minimum total ore supply acceptable within the working limits of the complete control assembly, as will be described.

Figure 4:
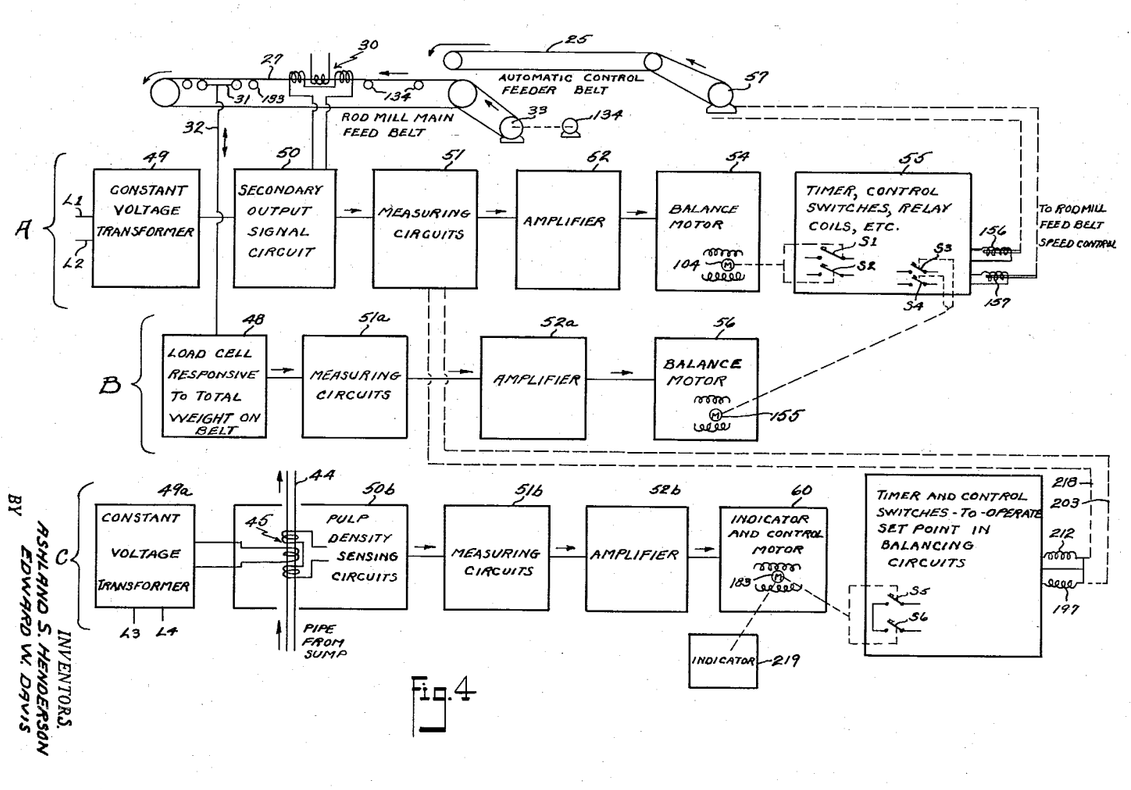
Fig. 4 is a block diagram with appropriate legends to illustrate generally the functions of the elements shown in Fig. 3.

Referring for the moment to Fig. 4, the control elements, which are mainly electrical, may be regarded for convenience of discussion as being arranged in three "lanes" extending horizontally in Fig. 4. It may be mentioned that the actual circuitry is likewise shown in three lanes in Fig. 3. Returning to Fig. 4 it will be noted that in lane A a constant voltage transformer 49 energizes a signal circuit 50 from the secondary of coil 30, the output being transmitted to measuring circuit 51, and the resultant signal, if any, being amplified by amplifier 52. The amplifier output (if any) is made effective on means including a balance motor unit 54 which in turn operates switch contacts in a switching unit 55.

Referring for the time being to lane B, the load cell output from box 48 is transmitted to measuring circuit 51a (so identified because identical with 51 in lane A), the resultant signal (if any) being amplified by amplifier 52a, and the output of amplifier 52a being rendered effective on a balance motor unit 56. This motor operates high-low limit switch contacts in unit 55 of lane A. The integrated output from unit 55 controls the speed of motor 57 to cause it to increase or decrease in speed, and consequently to vary the amount of ore supplied by auxiliary belt 25 to the main conveyor feeding rod mill 28 (Figs. 1 and 2).

Lane C has a constant voltage transformer 49a energizing the primary winding of unit 50b, the primary and secondary of which surround pulp supply pipe 44. The output secondary signal is supplied to measuring circuit 51b (equivalent to 51 and 51a) the resultant signal (if any) being transmitted to amplifier 52b (equivalent to 52 and 52a). The amplified output is passed to a measuring motor unit 60 which operates a total weight indicator and likewise is effective on the reset point of the balancing circuit unit 51 in lane A so as to exert a control on the rod mill supply, as will appear.

Referring now to the electrical circuits and members associated therewith we show, in lane A of Fig. 3, the sensing means responsive to the amount of the magnetic material moving on the main rod mill feed conveyor 27, which travels at constant speed responsive to motor 33 (Fig. 4). The sensing means comprises the coil unit 30 surrounding the conveyor. The unit consists of primary coil P and two secondary coils $S_1$ and $S_2$ which in the preferred embodiment are axially spaced one on each side of the primary. The primary is energized by an alternating current from $L_1$, $L_2$ which acquires a constant voltage in transformer 49. A current is induced in the secondary circuit proportional to variations in magnetic content of the material passing through the coil assembly. Such variations arise from changes in the amount of magnetic material passing on the conveyor. The voltage developed in the secondaries $S_1$ and $S_2$ is proportional to the amount of magnetic material intersecting the magnetic flux field of the coil unit, and changes in the secondary output accurately reflect changes in the magnetic content of the ore.

The A.C. current flowing in the secondary circuit is rectified by diode 64 so that the D.C. voltage drop across resistor 65 is proportional to the aforesaid amount of magnetic material. It is necessary to make an operating correction for extraneous effects in the operating circuit other than those resulting from passage of the magnetic fraction of the ore on the conveyor. This correction is effected by taking part of the transformer output through a phasing capacitance 66 and a variable resistor 67 in conjunction with a fixed resistor 68. In essence, the object is to vary resistor 67 to produce at diode rectifier 69 a voltage equivalent to that at diode 64 when the circuits are energized but no magnetic material is passing on the conveyor. Under these conditions the D.C. voltage across resistor 65 is equal and opposite to the D.C. balancing voltage across resistor 68 with no magnetic material passing.

A variable resistor 70 and a coupled capacitor 71 act as a matched resistance-capacitance circuit to dampen the signal developed by passage of magnetic material. Resistor 70 could be of fixed value, but for convenience a variable resistor is provided to modify the signal voltage at points 72, 73, so that a signal of predetermined potential can be fed to the subsequent circuit elements.

The signal from points 72, 73 is shown in Fig. 3 as being delivered in succession to two units consisting respectively of a measuring circuit 51 and an amplifier 52. The measuring circuit is shown in greater detail in Fig. 5 and a suitable amplifier in Fig. 6.

Figure 5:
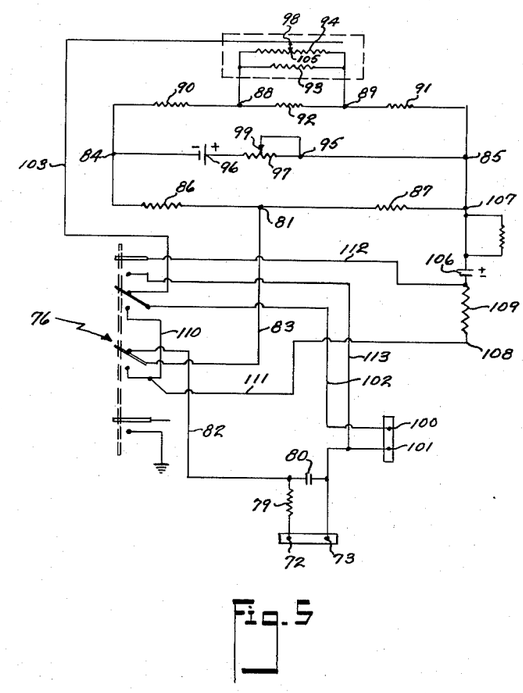
Fig. 5 shows the wiring arrangement of a balancing circuit used at several locations in Fig. 3.

Referring now to Fig. 5, the points 72 and 73 on Fig. 3 may be indicated as the input points similarly identified at the bottom of Fig. 5. In the circuit of Fig. 5 as will directly appear we have provided a battery-balanced resistance bridge. The battery is periodically checked against a commercially obtainable laboratory standard cell which, when used only as an occasional check means, remains at constant value for a long period. We have provided a multiple throw switch 76 which can be manually thrown to a check position at selected intervals, but which normally is in the opposite or running position.

At the signal input point there is a resistor-capacitor alternating circuit consisting of resistor 79 and a capacitor 80. Switch 76 is in the upper or normal operating position, which places resistor 79 in electric circuit communication with point 81 through lines 82 and 83. The upper part of Fig. 5 constitutes a balancing bridge of the Wheatstone general type, in which points 84, 81, 85, and the intermediate resistors 86 and 87 form a lower arm, and points 84, 88, 89 and 85 and the intermediate resistors 90, 91, and the parallel resistor assembly 92, 93 and 94 form the upper arm. The intermediate cross arm 84, 95, 85 contains the battery 96 and a variable resistor 97. In the parallel resistor bank 92, 93, 94 is a variable element for balancing purposes, as will appear.

Battery 96 supplies a constant voltage between points 84 and 85. This voltage is arranged to be of opposite polarity to the signal being measured. With the switch still in the upper position the incoming signal to be measured proceeds from point 72 through lines 82 and 83 to point 81, and from point 73 through the amplifier (connected at points 100 and 101) and then through lines 102 and 103 to point 98. Signal voltage at the terminal points 81 and 98 therefore is disposed, by means of the measuring bridge above described, to be opposed in polarity to the voltage of battery 96. The amplifier in series with terminals 100 and 101 is connected to measure and amplify any difference between the established battery voltage and the fluctuations in the incoming signal from the induction couple heretofore described. The amplified current energizes a motor 104 in unit 54, the function of which will appear. It may now be stated that one of its functions is to operate the sliding contact 105 on resistor 94 (Fig. 5) to a position such that the voltage produced by battery 96 across points 81 and 100 is equal and opposite to the incoming signal at 72, 73. It is apparent that when the signal is thus balanced there will be not output signal at points 100 and 101, which will in turn leave no potential to be amplified and consequently motor 104 (Fig. 3) will stop. Motion of the motor to the stop position, however, will have made the necessary adjustments in the further controlled elements to achieve the preliminary results desired.

To assure a proper balancing voltage output from battery 96 (Fig. 5) it is occasionally checked against a standard cell 106, as follows. Manual switch 76 is moved to its checking position, during which movement a clutch mechanism (not shown) simultaneously connects the slider 99 on resistor 97 with contact 98 (Fig. 5).

With the switch in the down or "check" position the voltage originating in battery 96 and developed across resistor 87 is compared with the voltage of standard cell 106 and impressed between points 107 and 108. Since the signal voltage at terminals 72 and 73 has been disconnected by moving switch 76 to the check position, the amplifier will now amplify a differential impressed across resistor 109, the amplifier circuit proceeding from terminal 100 through lines 102, 110, 111 to resistor 109, lines 112 and 113 to terminal 101. Any detectable potential difference between the battery 96 and standard cell 106 will be amplified by the amplifier which will cause motor 104 to move and to operate the sliding contact 99 on variable resistor 97 so as to cause the battery voltage across resistor 87 to balance the standard cell voltage by making the two voltages equal and opposite. This will periodically check and adjust the battery voltage and insure accurate measuring of the incoming signal at 72, 73. Switch 76 is of course returned to the upper or normal operating position after each check.

Figure 6:
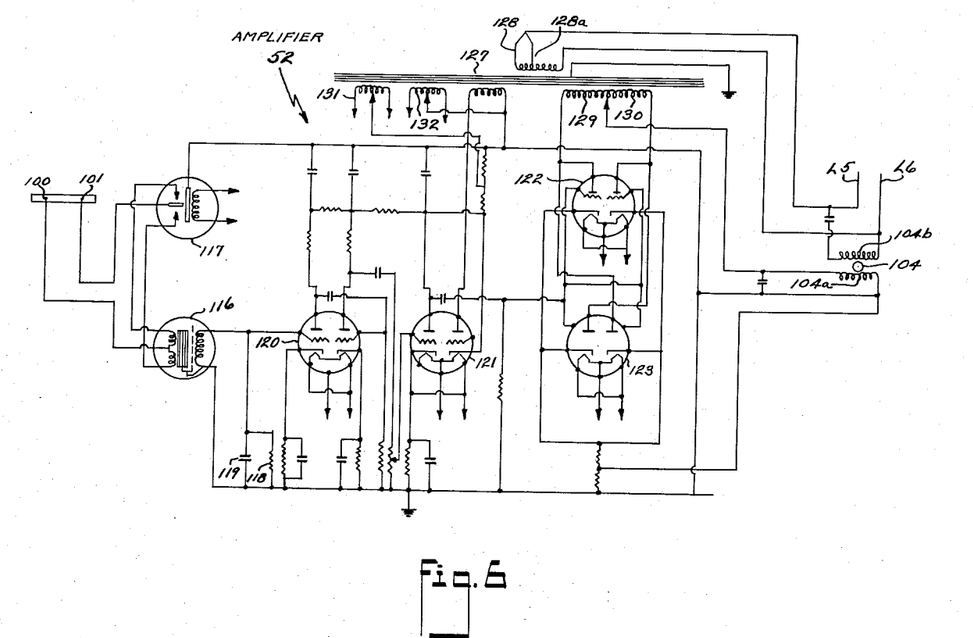
Fig. 6 shows the wiring arrangement of an amplifier used at several locations in Fig. 3.

Proceeding from terminal points 100 and 101 of Fig. 5 we arrive at the similarly identified terminal points at the left side of the amplifier diagram, Fig. 6. This shows a fairly conventional D.C. amplifier which takes the low potential signal coming in at 100, 101, and amplifies it sufficiently to energize balancing motor 104 (Fig. 3). As has been seen, the balancing motor operates to return the energizing voltage to a zero value. As heretofore intimated, as long as the voltage at terminals 72, 73 is constant no potential difference is detected at terminals 100, 101. The position to which motor 104 moves to achieve this balance is then representative of the signal impressed at the points 72, 73. The motor 104 may operate a pen, schematically indicated by a rectangle 115 on Fig. 3, which records the value of the signal voltage.

In Fig. 6 the unbalance of the measuring circuit is noted at terminal points 100 and 101 and is converted to alternating current by input transformer 116 and converter 117 and shaped by the matched resistor-capacitor elements 118 and 119. The alternating current signal is then fed to two 12AU7 tubes 120 and 121 in tandem amplifying relationship, and thereafter the output from these tubes is delivered to the grids of two 12AX7 tubes 122 and 123. The greatly amplified signal is then fed to one winding 104a of the two phase motor 104 already mentioned (Fig. 3), the other winding 104b being energized from lines L5 and L6 of a 110 volt A.C. supply. Power transformer 127 has a primary 128 energized from lines L5, L6 with an optional adjustable tap 128a. Various secondary taps provide voltages where needed, for example taps 129 and 130 supply plate potentials of approximately 275 volts for the tubes 122 and 123, and taps 131 and 132 supply filament voltage for tubes 120 and 121. Since the amplifier's characteristics and circuits will be apparent to one skilled in the art, no further or more detailed description is necessary.

We have now rather fully explained the development of an electric signal proportional to the amount of magnetic material travelling on the rod mill conveyor, and the rendering of said signal operative on motor 104 to perform certain further control operations.

We sum up at this point the functions of motor 104, which responds to any signal from amplifier 52 shown in block outline in Fig. 4 and in circuit detail in Fig. 6. Motor 104 operates (a) a pen for recording, (b) the movable adjusting point 99 on battery rheostat 97 (Fig. 5), (c) the adjusting slider 105 on rheostat 94 (Fig. 5), and (d) a pair of mercury switches $S_1$ and $S_2$ in unit 55.

We have provided a scale head which responds accurately to the total weight of ore on main conveyor 27. Referring to Fig. 4 it will be noted that conveyor 27 is of the endless type and its upper or load-bearing flight is supported on spaced rollers or rods 133 extending transversely under the conveyor belt. The weighing zone lies between any two adjacent rollers. In this weighing zone the belt contacts a cradle 31 previously mentioned which, through suitably linked scale levers and a plunger 32, operatively contacts a load cell unit 48 which operates as follows: The main conveyor drive motor 33 has previously been identified as a constant speed motor in our description of the units shown in Fig. 2. This motor drives a tachometer generator 134 which develops a constant voltage applied at terminals 139 and 140, through compensating resistors to achieve a suitable potential drop for the load cell system. It will be understood that the electrical characteristics, including the resistance, of a load cell vary with tension or compression applied on operative points thereon, and the purpose of the scale head structure operated by cradle 31 and effective on plunger 32 is to apply to the load cell variations in tension or compression proportional to variations in the load on the conveyor. These variations will cause corresponding fluctuations in the electrical balance of the load cell which will become effective on output points 143 and 144. The output circuit may be balanced for localized variations by means of a movable divider contact 145 on resistor 146 and also by a switch 147, which can shunt out or in a resistor 148.

The output of load cell 48 is applied at points 153 and 154 on measuring circuit unit 51a, identical with that already described and shown in Fig. 5, and the output, if any, is transmitted to amplifier unit 52a which is identical with the unit 52 shown and described in connection with Fig. 6. The resultant amplified signal, if any, is applied on winding 155a of motor 155 in unit 56, and the motor armature appropriately rotates to close or open mercury switch points in unit 55; the operation of which will now be described. This control unit 56, responsive to motors 104 and/or 155, correlates the controlling effect of lane A (responsive to variations in magnetic content on conveyor 27) and lane B (responsive to total load variations on conveyor 27).

Unit 55 has as its object to energize either a relay coil 156 or a relay coil 157 when a received signal varies. These coils energize power relays which in turn vary the tension of the clutch on the Reeves power unit. This type of drive is conventional and need not be shown here. Unit 55 is energized from lines L7 and L8 through a timer 158 which periodically, say every 20 minutes, closes switch 159 for a few seconds. Selector switch 160 is a manual switch which allows the operator to place any single auxiliary belt 23, 24, 25 and 26 under automatic control by placing the movable contractor on either point 1, 2, 3 or 4, corresponding for example to belts 23, 24, 25 or 26. Point 1 corresponds to belt 25 which is therefore under automatic control.

The actual operation will be understood from a recitation of several specific examples. Assume that the signal from amplifier 52 indicates that the magnetic fraction on conveyor 27 is falling below the predetermined point (as determined by the setting of sliding contact 105, Fig. 5) and that it is desired to increase the speed of motor 57. As a result of unbalance in the measuring circuit of unit 51, and the amplification of the resultant signal in amplifier 52, motor 104 will turn and close mercury switch $S_1$. Switch $S_3$ is normally closed and when the timer 158 closes its switch 159 power from L7, L8 will energize coil 156 through the following circuit: from L7 through conductors 163 and 164, coil 156, conductor 165, normally closed switch $S_3$, conductors 166 and 167, presently closed switch $S_1$, closed timer switch 159, conductor 168 and 169 to L8. Coil 156 being energized the Reeves tension clutch will operate appropriately to increase the speed of the drive for belt 25. Coil 170, which established the automatic control of belt 25, has been energized through lines 163 and 164, coil 170, lines 171, 172 and 169.

Assume that the signal from sensing coil 30 reports an amount of magnetic material in excess of the preset figure, then motor 104 turns in reverse direction, opening switch $S_1$ and closing switch $S_2$, and consequently upon the next closing of timer switch 159, coil 157 is energized as follows: from L7 through conductors 163 and 164, coil 157, conductors 175 and 179, switch $S_2$ (now closed), conductor 176, switch 159 (temporarily closed) and conductors 168 and 169 to L8. The energization of coil 157 slacks off the tension on the Reeves clutch and belt 25 slows down, as required. It will be recalled that when the armature of motor 104 makes the desired arcuate rotation responsive to the signal from amplifier 52 it also resets the slider 105 on resistor 97 (Fig. 5) to reestablish equilibrium conditions, whereupon switch $S_1$ returns to normally closed position and switch $S_2$ to normally open position.

The control exercised by lane B operates as follows: Returning again to the situation wherein coil 156 is energized, periodically, when timer motor closes switch 159, and switches $S_1$ and $S_3$ are closed, these last two switches being in series. Motor 155 (upon continuing demand for additional magnetic material) continues to rotate and, when the capacity of the control system to handle more material is approached, motor 155 opens switch $S_3$ breaking the "increase" circuit to coil 156.

Assume that too much magnetic material is being supplied, and that motor 104, upon successive operations of the timer switch 159, makes corresponding arcuate rotations to reduce the feed on belt 25 by successive closings of switch $S_2$ to periodically energize coil 157 through the following circuit: from line L7 through conductors 163, 164, coil 157, lines 175, switch $S_4$, normally closed, line 179, switch $S_2$ now closed, line 176, timer switch 159 now closed, and lines 168 and 169 to L8. Each such successive energization of coil 157 decreases the clutch tension in the Reeves drive to motor 57, slowing down the feed of auxiliary belt 25. After each such energization motor 104 rebalances the measuring circuit in unit 51, Fig. 5, so as to open switch $S_2$ in a manner already explained. However when and if the auxiliary belt control has slowed the feed to a pre-established minimum the load cell 48 has likewise been operative on motor 155 to the point where it opens the normally closed switch $S_4$ in series with switch $S_2$ de-energizing coil 157. This breaks the "decrease" circuit to coil 157.

The maximum and minimum capacities of motor 155 are established to handle normal variations in the ore supply. A warning light or an audible warning signal may be provided if the control reaches the maximum or minimum limit of the operating range.

Timer motor 158 is continuously energized through a circuit extending from L7, conductors 163, 177, 178 and 168 to L8. The reason for supplying the time arrangement is that it takes a certain period, say twenty minutes, for corrective effects to become evident at the eventual control point (coil 45 in lane C) and if the controls were in continuous operation there would be a material overcorrection or undercorrection before the magnetic material reached coil 45. The corrections are therefore made and the controls are then rendered inoperative to give the effect of the corrections time to reach the ultimate sensing point before more control action is taken by coils 30 or 54.

The function and co-operation of lane C will now be described. Referring to Figs. 1 and 4 it will be recalled that a primary-secondary inductive coupling coil 45 surrounds the pipe 44 conveying the pulp from the sump to the cyclone separators. This couple is identical in structure and operation with coil 30 of lane A as are also its cooperating circuits in units 51b, 52b, and 60. The primary of the couple is energized by constant voltage transformer 49a. Motor 183 responds to any amplified signal resulting from an unbalance in the system caused by a variation from a preset magnetic content in the pulp. Taking for illustration a specific example, when motor 183 turns, responsive to an unbalance caused by too high a magnetic concentration, it closes switch S₅ and energizes a relay coil 161 through the following circuit: from L13 through conductors 184 and 185, switch S₅ now closed, conductor 186, switch S₁₁ in "b" position, conductor 187, relay coil 161, conductors 188 and 189, timed switch 190 now closed by motor 191, conductors 192, 193 and 194 to L14. Energization of relay 161 swings the ganged arms of switches S₇, S₈ and S₉ to their upper or "a" positions so that coil 197 is energized by means of the following circuit: from L14 by conductors 194, 204 and 198, switches S₉ in "a" position, conductor 200, coil 197, and conductors 201, 202 and 213 to L13. Energization of coil 197 activates a mechanical linkage to move a ratchet effective on control contact 105 on resistor 94 (Fig. 5) in unit 51 (Fig. 3) as indicated by the broken linkage line 203. As will now be understood, a change in this control point has the ultimate result of producing a change in feeding speed of belt 25 through previously described elements and in this example through coil 157 in unit 55. Elements 195, 196 and 199 and identically illustrated elements elsewhere in Fig. 3 are diodes producing current rectification in their appropriate circuits.

As a further illustration, if the magnetic concentrate of the pulp in pipe 44 is too low, the following effects are produced. Relay coil 206 is energized through the following circuit. From L13 through conductors 184, 207, 185 and 208, switch S₆ now closed by motor 183, conductor 209, switch S₈ in "b" position, conductors 210 and 211, relay 206, conductor 189, timer switch 190 (temporarily closed by timer motor 191), and conductors 192, 193, and 194 to L14. Energization of relay 206 moves ganged switch arms S₁₀, S₁₁ and S₁₂ to their upper position whereupon coil 212 is energized as follows: line L14 through conductors 194, 204, rectifier 195, conductors 198, and 215, switch S₁₂ now in "a" position, conductor 216, coil 212, and conductors 202 and 213 to L13.

Energization of coil 212 activates a mechanical linkage 218 to move the ratchet effective on reset contact 105 on resistor 94 (Fig. 5) in unit 51 (Fig. 3). As previously discussed a change in this reset point has the ultimate result of producing a change in feeding speed of belt 25 through previously described elements, and in this example through coil 156 in unit 55.

An indicator 219 may be operated by motor 183 to periodically show and record the total weight of magnetic material in the pulp, as sensed by coil 45.

The essential elements of our sump level control are pictorially illustrated in Fig. 7. There is shown a pulp container 220 in which the pulp level is indicated at 221. A float 222 operates a swingable link 223 pivoted at 224 and effective on a plunger rod 225 which has at its lower end valve means 226 controlling the flow of air from pipe 227 to pipe 228, the controlling arrangement being enclosed in a pilot control housing 229. When the liquid level in the sump drops the float likewise drops, opening valve 226 and air flows from pipe 227 through valve 226 to pipe 228 and through normally open valve 229 (valve 230 being closed) through pipe 231 to a diaphragm chamber 232. Operation of the diaphragm operates a valve stem or plunger 233 to open its valve 234 and admit water through pipe 235. When the liquid rises to a pre-determined level the float 222 closes valve 226 which is equipped with venting means (not shown) to relieve pressure in the diaphragm chamber 232 to permit valve 234 to close.

Should it be desired to put the liquid level system on manual control the operator need only close valve 229 and open valve 230, upon which air flows from pipe 227 through branch pipes 236 and 237 to pipe 231 and the diaphragm valve will remain open as long as valve 230 is open in which case the diaphragm chamber may be provided with venting means to relieve the residual pressure. The level control means in actual use is somewhat more mechanically complex than here illustrated but it is believed that a showing of the essentials will be presently sufficient.

We have shown how the operation, using the various elements such as a rod mill, a ball mill, several magnetic separators, a sump, and certain cyclone classifiers, is controlled from three different aspects by means of (a) a pulp density signal responsive to the magnetic output from the sump; (b) a magnetic content signal responsive to the amount of magnetic material on the main feed conveyor to the rod mill, and (c) an actual weight maximum-minimum limit control responsive to the total weight of material on the main feed conveyor to the rod mill. The coaction of these three governing controls produces a constant pulp density delivered to the cyclone classifiers with consequent ability to achieve the highest possible efficiency within practical operating limits, and also a constant re-circulating load on the ball mill and magnetic separators.

What is claimed is:

1. In ore refining apparatus of the type described wherein a pulp stream is delivered to a cyclone separator for separation into a coarser fraction and a finer fraction, the coarser fraction being recirculated to refining means and returned to said cyclone separator, means for insuring a constant feed to said cyclone separator including a coarse grinding mill, a main conveyor for delivering ore past a measuring zone to said coarse grinding mill, a feeder for delivering ore to said main conveyor, driving means for said feeder, first sensing means adjacent to said measuring zone and responsive to variations in quantity of the magnetic fraction on said conveyor and adapted to emit a first variable signal proportional in intensity to said variations, means including measuring circuits for establishing an operative connection between said first sensing means and said driving means whereby to vary the rate of operation of said driving means proportionally to variations in said signal, means for transmitting the ore slurry product of said coarse grinding mill through a further refining circuit including a conduit for carryng the refined pulp slurry suspension to further separation devices including a cyclone separator, a second sensing means adjacent to said conduit adapted to emit a second signal proportional to the amount of magnetic material moving through said conduit, and electric circuit means establishing an operative contact between said second sensing means and said measuring circuits whereby to correlate and integrate said first and second signals, and to cause said feeder to deliver to said main conveyor an amount of ore disposed to maintain the pulp slurry in said conduit at a predetermined magnetic content, and ultimately to insure a constant pulp feed to said cyclone separator.

2. Apparatus as defined in claim 1 wherein said refining circuit includes a sump for receiving the pulp suspension and discharging it into said conduit, and means for maintaining the liquid in said pulp at a constant level.

3. Apparatus as defined in claim 1 including means in operative contact with said main conveyor and operatively responsive to changes in total weight of ore carried on said conveyor and adapted to cooperate with said first sensing means whereby to become effective on said driving means to establish maximum-minimum ore delivery limits within which the asserted control elements are operative.

4. Apparatus as defined in claim 1 wherein said refining circuit includes, in operating sequence, a first magnetic separator, a fine grinding mill, a second magnetic separator, a sump which discharges into said conduit, and a pump at said sump adapted to maintain constant pressure conditions in said conduit.

5. Apparatus of the type described for refining ore having a magnetic fraction, comprising a coarse grinding mill, a main conveyor for delivering ore past a measuring zone to said mill, a first feeder for delivering a fixed fractional amount of ore to said main conveyor, a second feeder for delivering a variable fractional amount of ore to said main conveyor, driving means for said second feeder, a first sensing means adjacent to said measuring zone and responsive to variations in quantity of the magnetic fraction on said conveyor, and adapted to emit a first signal which is variable proportionally to said variations, means including a signal measuring circuit establishing an operative connection between said first sensing means and said driving means whereby to vary the rate of operation of said driving means proportional to the balanced signal, means for transmitting the ore slurry product of said coarse grinding mill through a further refining circuit including a conduit for carrying a refined pulp suspension to further separation devices, a second sensing means adjacent to said conduit adapted to emit a second signal proportional to the amount of magnetic material moving through said conduit, and electric circuit means establishing an operative contact between said second sensing means and said measuring circuit and effective to correlate and integrate said first and second signals to produce a resultant integrated signal, said integrated signal being effective on said driving means whereby to cause said second feeder to deliver to said main conveyor an amount of ore disposed to maintain said pulp suspension at a predetermined magnetic content.

6. Apparatus as defined in claim 5 wherein said refining circuit includes a sump for receiving the pulp suspension and discharging it into said conduit, and means for maintaining the liquid in said pulp at a constant level.

7. Apparatus as defined in claim 5 including load-sensitive means in operative contact with said main conveyor and operatively responsive to changes in total weight of ore carried on said conveyor, and adapted to cooperate with said first sensing means whereby to become effective on said driving means to establish maximum-minimum ore delivery limits within which the asserted control elements are operative.

8. Apparatus as defined in claim 5 wherein said first and said second sensing means each comprises a primary-secondary inductive couple adapted to emit a secondary signal consisting of an induced current upon variations produced in the magnetic field developed by passage of magnetic material in varying amounts past the primary.

9. Apparatus as defined in claim 5 wherein said refining circuit includes, in operating sequence, a first magnetic separator, a fine grinding mill, a second magnetic separator, a sump which receives a liquid pulp suspension from said second magnetic separator, a pump which receives the pulp from said sump and discharges it to said conduit.

10. Apparatus as defined in claim 9 including means for maintaining the liquid in said sump at a constant level whereby to maintain constant inlet pressure conditions at said pump.

References Cited in the file of this patent
UNITED STATES PATENTS

| | | |
|---|---|---|
| 1,619,807 | Blomfield | Mar. 8, 1927 |
| 2,499,347 | Adams | Mar. 7, 1950 |